United States Patent [19]

Hammond et al.

[11] 4,206,536

[45] Jun. 10, 1980

[54] REPAIR PANEL FOR AUTOMOBILE PINCHWELDS AND METHOD OF USING SAME

[75] Inventors: Leonard B. Hammond, Grand Island; George B. Hammond, Eustis, both of Fla.

[73] Assignee: Premier Industrial Corporation, Cleveland, Ohio

[21] Appl. No.: 973,861

[22] Filed: Dec. 28, 1978

[51] Int. Cl.² .................................................. B22D 19/10
[52] U.S. Cl. .................................. 29/402.11; 428/573; 296/84 D; 49/482; 113/116 F
[58] Field of Search ............. 29/401 D; 428/573, 595, 428/596, 603; 296/84 R, 84 A, 84 D, 93; 49/482, 493; 113/116 A, 116 C, 116 F, 116 H, 116 HA, 116 Y, 116 CC, 116 HH

[56] References Cited

U.S. PATENT DOCUMENTS

| 1,004,788 | 10/1911 | Higgin | 49/482 |
| 2,355,707 | 8/1944 | Boer | 113/116 F |
| 2,671,935 | 3/1954 | Flues | 49/493 |
| 3,904,380 | 9/1975 | Smith | 428/603 |
| 4,099,765 | 7/1978 | Bright | 296/93 |

*Primary Examiner*—Lowell A. Larson
*Attorney, Agent, or Firm*—Isler and Ornstein

[57] ABSTRACT

Permanent repair of a rusted pinchweld in the windshield securing channel of an automobile is effected by replacement of the rusted portion with a highly malleable repair panel of novel design. The repair panel has a generally Z-shaped cross section and dimensions compatible with the pinchweld of an automobile. The panel is secured to unrusted pinchweld by any suitable means and rendered leakproof by suitable body repair procedures. The reconstructed pinchweld offers a base for windshield replacement closely approximating the original construction. Further degeneration is checked by rendering the entire repaired structure leakproof with proper installation techniques.

5 Claims, 8 Drawing Figures

U.S. Patent    Jun. 10, 1980    4,206,536
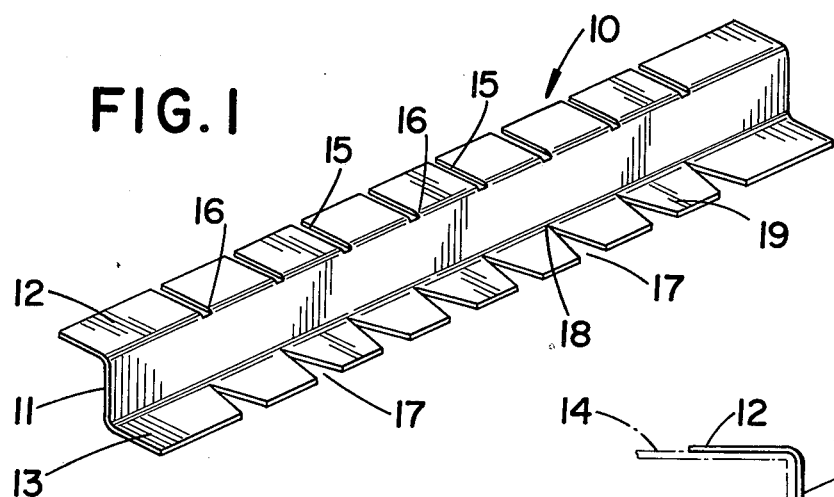
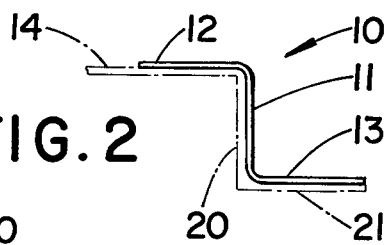
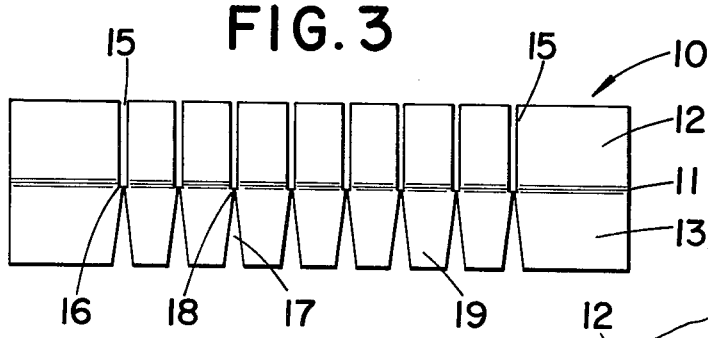
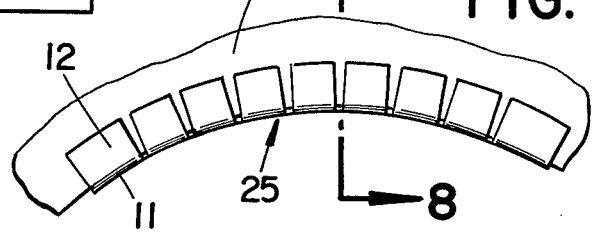
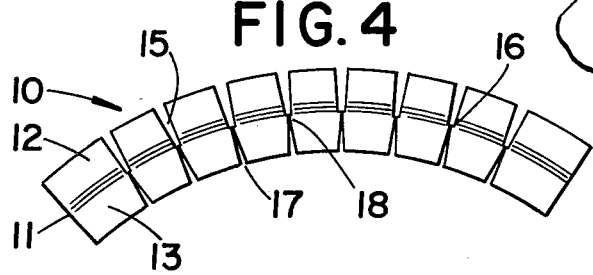
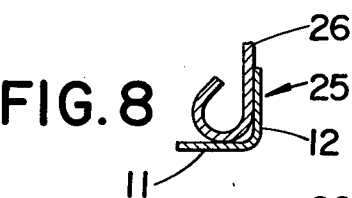
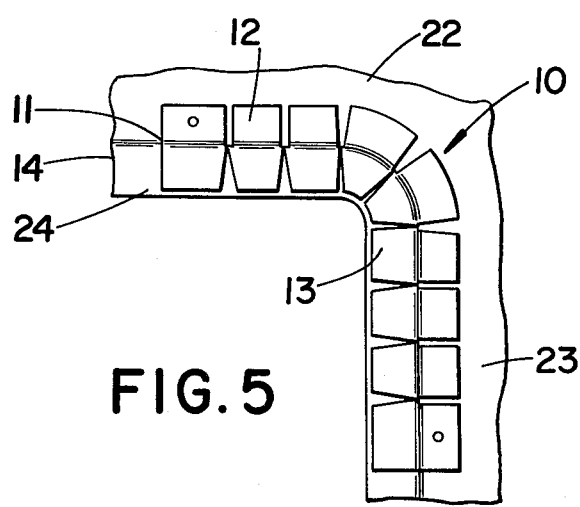
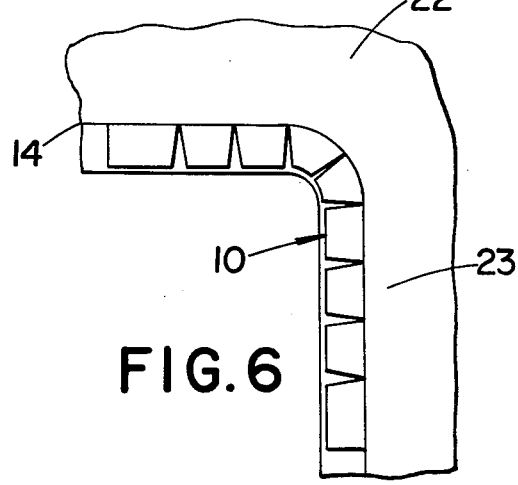

REPAIR PANEL FOR AUTOMOBILE PINCHWELDS AND METHOD OF USING SAME

BACKGROUND OF THE INVENTION

The repair of damaged automobiles has long been a costly problem, particularly with respect to rusting.

Automobiles have a particular tendency to rust in the pinchweld or channel in which the windshield is mounted, if there is any break in the seal. The pinchweld is defined by the periphery of sheet metal portions of the automobile around the windshield opening, including the leading edge of the roofline, the cowl line and the oppositely disposed windshield pillars. The construction is identical regardless of whether the front or rear light or windshield is considered. The windshield is installed by placing an adhesive sealing means such as a gasket or sealing material around the entire perimeter of the pinchweld and positioning the glass on the sealing means. Chrome moldings are generally mounted over the juncture of pinchweld and glass for decorative concealment, rather than functional purposes.

The pinchweld area is highly vulnerable to water retention and consequent rusting, particularly in the corners. Although rust deterioration of the pinchweld is not ordinarily visible, it manifests itself by water leakage around the windshield. When the automobile is brought in to correct the leakage problem or to replace a cracked windshield and the glass is removed, the previously concealed deterioration is exposed.

Two basic methods of repair have been devised for repair of the deteriorated pinchweld. The solutions are generally either reconstruction with body tapes or fillers or replacement with new body sections. The first method uses a plastic filler to replace rusted metal after grinding away as much rust as possible, and reconstructing the area with the body filler, or sometimes merely with a patching tape. However, body fillers, which are generally synthetic resins, tend to be only a temporary solution, as they are not durable, cannot withstand stress and do not deter further rust propagation around the filler.

The second method uses automobile body sections to replace the damaged area and may be accomplished by various means. For example, the replacement sections could be factory replacements, but these are rarely available and are extremely expensive. More often, an attempt is made to find a salvaged automobile of identical make from which the necessary body portion must be removed by torch cutting and brought to the repair shop. In either case, when the rusted portions have been removed, the replacement section must be laboriously secured in position and in proper registry on the automobile, usually by skillful welding.

Once the replacement part has been secured in the proper position, a great deal of finish work is necessary to smooth the exposed surfaces in an attempt to restore the automobile to its original condition. The removal, replacement, fitting and finish work require a relatively high degree of expertise not generally found in a windshield repair shop, but requiring a skilled body repairman. The cost involved is extremely high.

In the case of rusting of the pinchweld, which is a rather frequent occurrence, new factory replacement panels, even if obtainable, are prohibitive in cost. The option of obtaining and using a body portion from a salvaged automobile may be somewhat less costly, but such salvage parts are not always available when needed and the cost of obtaining and installing such a body part is still relatively high.

SUMMARY OF THE INVENTION

The present invention relates generally to the repair of a rusted pinchweld of an automobile, as well as to a rusted fender edge.

A more convenient and economical alternative to the two presently accepted methods of repairing a rusted pinchweld is achieved through use of the repair panel and method of the present invention. A permanent and durable repair is accomplished more quickly and at considerably less cost than with prior art methods. The method of the present invention also results in a repaired structure far more lasting and durable than the prior art method of using a patching tape or body filler, which is presently used in the majority of pinchweld repairs.

A novel repair panel is utilized with the method herein disclosed to provide a lasting repair of the rusted pinchweld. The repair panel or strip is constructed of highly malleable and easily bendable metal electrolytically compatible with the metal used for automobile body portions. While any rusted material should preferably be completely removed, the total removal of the affected pinchweld need not be undertaken. The repair strip is permanently secured to the remaining sound material of the pinchweld and seldom is it necessary to engage in extensive refinishing operations.

The repair strip or panel has a generally Z-shaped cross section with dimensions that are compatible with the dimensions of the pinchweld of most automobiles. The strip is provided in standardized lengths along which specially shaped slots are provided transverse to the length of the strip to allow the strip to be easily bent and conformed to the particular contour of the pinchweld area being repaired. Additionally, the slots in the strip provide stress-relieving segments which enhance the ability of the repair area to withstand motion stress during travel of the automobile.

The method of installing the disclosed repair strip allows installation by windshield replacement personnel who need not be as highly skilled as automobile body repairmen. Cutting of the rusted portion and welding of the repair strip may be completely avoided, if desired. While some refinishing work, such as smoothing body lines and painting is desirable, the need for a high degree of expertise is eliminated.

BRIEF DESCRIPTION OF THE DRAWINGS

FIG. 1 is a perspective view of the repair panel of this invention:

FIG. 2 is an end view of the repair strip of FIG. 1, with the pinchweld environment shown in phantom outline;

FIG. 3 is a top plan view of the repair strip of FIG. 1;

FIG. 4 is a top plan view of the repair strip as partially bent or formed for use in a pinchweld repair;

FIG. 5 is a fragmentary view in elevation of the repair strip positioned in the pinchweld of an automobile;

FIG. 6 is a fragmentary view in elevation, similar to FIG. 5, showing the appearance of the repair area after the repair strip has been permanently secured and the exposed portions have been smoothed;

FIG. 7 is a fragmentary view in elevation of a modified repair strip, as applied to the rusted edge of an automobile fender;

FIG. 8 is a cross-sectional view, taken as indicated on line 8—8 of FIG. 7.

DESCRIPTION OF THE PREFERRED EMBODIMENTS

Glass windshields or lights in most automobiles, both front and rear, are commonly installed by adherent contact with a gasket or sealing bed in an appropriately dimensioned channel which is an integral part of the body of the vehicle. The channel, hereinafter referred to as a pinchweld, is constructed in the stamping of the automobile body and by welding the edges of the body sheet metal. The body portions, which include the roofline, windshield pillars and cowl, form a channel or lip around the entire windshield area.

The pinchweld and windshield edge are generally overlaid and concealed with a decorative molding. The molding does not seal the pinchweld against water as the gasket or seal is intended to resist water leakage into the interior of the vehicle.

Any water in the pinchweld is ordinarily caused to be directed down the side of the windshield and is drained through appropriate passageways. In the event that an opening or break occurs in the sealing means, water can enter the vehicle. Leakage of the gasket or seal is generally not an initial problem, unless the windshield has been cracked or improperly replaced or, with weathering or the passage of time, the sealing means has cracked or deteriorated. However, leakage frequently results from rusting of the pinchweld, through which water enters the vehicle. Repair of such leakage cannot be successfully accomplished without removal of the windshield. As noted above, the repair of the rusted portions is generally effected through one of two methods. The first method using patching tape or body filler is only a temporary repair. The second method, involving body panel replacement, requires highly skilled expertise and is accomplished at a cost which may be ten times greater than the cost of the temporary repair method.

The present invention offers a permanent repair of an automobile pinchweld performed in a period of time and at a cost which compares favorably to the temporary method mentioned above. The invention includes a novel repair strip or panel and a method of installation.

FIG. 1 illustrates a novel repair strip, generally indicated by the reference numeral 10, for use in the repair of a rusted pinchweld of an automobile. The strip 10 has a central longitudinally-extending portion 11, which is generally disposed in a substantially vertical plane in installation, as indicated in FIGS. 1 and 2. The strip also includes a first extending portion 12 and a second extending portion 13, both of which are substantially perpendicular to the central portion 12 and extend in opposite directions therefrom in vertically spaced relationship to provide an upper sealing flange and a lower support flange, respectively. FIG. 2 illustrates the relative positions of the portions of the strip 10 in the environment of a pinchweld channel 14.

FIG. 3 is useful in explaining the particular design of the extending portions 12 and 13. The first portion 12 has a series of slots 15 extending from its juncture 16 with the central portion 11, through the free edge of portion 12. The slots 15 have parallel sides and are of narrow width. The slots must extend into the common edge 16 so that forming of the strip is not resisted. The first extending portion 12 not only serves as an abutment on the body of the automobile, but also provides a sealing flange which, as hereinafter described, prevents water from entering the pinchweld behind the central portion 11.

The second extending portion 13 has a series of slots 17 extending from its juncture 18 with the central portion 11, through the free edge of portion 13. The slots 17 are generally V-shaped with the vertex extending into the juncture 18. The angle formed by the sides of the slots 17 must be sufficiently large to permit bending of the portion 13 into an arc of at least 90°.

One purpose of the slots 15 and 17 is to allow the replacement strip 10 to be easily bent to conform to the contour of the opening defined by the pinchweld. FIG. 4 illustrates the status of the slots 15 and 17 when the strip has been partially bent or formed. The slots 17 allow the panel 10 to be bent concave relatively to the second extending portion 13, without interference or overlap. The slots 15 allow the first extending portion 12 to spread as this bending takes place.

However, the slots 17 serve an additional function. They separate the support flange 13 into substantially independent segments 19 which are free to move or bend slightly relatively to each other and relatively to the remaining portions of the strip 10, after installation, for a purpose more fully described hereinafter.

As noted above, the dimensions of the strip 10 are such that dimensional compatability of the strip with most pinchwelds is attained. Most automobiles are fairly uniform with respect to the dimensions of the pinchweld channel 14. The depth of the pinchweld, as defined by the vertical pinchweld wall 20, is approximately 0.75 inches, and the width of the central portion 11 of the strip corresponds approximately to this dimension. Similarly, the width of the pinchweld base or flange 21 is also about 0.75 inches and the width of the second extending portion 13 approximates that dimension. The portion 12 is exterior of the pinchweld channel 14 and thus its width is not limited by any dimension of the existing pinchweld. However, for purposes of minimizing refinishing of the repaired area, it is desirable that the width of the portion 12 be minimized to 0.75 inches or less.

The repair strip 10 can be provided in convenient lengths of approximately one foot or multiples thereof, so as to be of sufficient length to repair most rusted pinchwelds and, more particularly, any rusted corner of a pinchweld. The slots 15 and 17 are closely spaced, preferably no more than one inch apart, and preferably extend substantially the entire length of the strip 10, although they may be along only part of the strip.

While a particular type of metal for the replacement strip 10 is not critical, there exist specific practical requirements. Since it may be desired to braze or weld the strip 10 to the automobile body, the material used should be a compatible and easily bonded metal. This requirement, as a practical matter, eliminates metals which require special bonding techniques, such as aluminum, stainless steel and many non-ferrous alloys. The most useful metals are cold and hot rolled steel.

The metal of the strip 10 is fairly thin and highly malleable and not less than the metal thickness of the automobile, generally 24 gauge. The malleability of the metal is an important consideration. In this regard, it is mandatory that the metal have virtually no elastic memory, i.e., no tendency to return to any previous shape. It must be sufficiently free of elasticity or resiliency to approach a dead soft condition, so as to be malleable enough to allow the strip 10 to be easily shaped by hand, and retain that shape to conform to the contour of the pinchweld at the area to be repaired.

FIGS. 5 and 6 illustrate the method of using the repair strip 10 to repair a rusted pinchweld. The automobile includes a roofline 22, pinchweld 14, windshield pillars 23 and cowl line 24. The pinchweld is physically formed in the initial manufacture of the automobile body by combining portions of the roofline 22, pillars 23 and cowl line 24 around the periphery of the windshield opening.

The corners of the pinchweld 14 are particularly susceptible to rusting. The repair process is commenced by removing the glass windshield by well known methods. The entire pinchweld channel 14 is cleaned to assure removal of any dirt, loose rust and sealing materials. Sometimes, a badly deteriorated portion is removed entirely.

The pinchweld 14 may include pins or studs (not shown) which are utilized to secure the decorative molding over the pinchweld and windshield edge. These pins or studs should be removed in the area of the pinchweld which is to be repaired.

A length of repair strip 10 sufficient to completely bridge the unsound pinchweld portion is selected and manually formed to conform to the contour of the repair area. The formed strip 10 is placed in position in the pinchweld such that the central portion 11 and the second extending portion 13 overlie the wall 20 and base 21, respectively, of the pinchweld channel, as indicated in FIG. 2. The first extending portion 12 overlies and abuts the roofline 22, which term is used in the art to include the pillars 23.

The next step in installing the repair strip is securing the strip to the pinchweld 14. While any method for securing the strip may be used, rivets are preferred in this disclosure to allow installation by relatively unskilled workmen. Holes are drilled through the portion 11 and/or 12 of the replacement strip 10 and the pinchweld 14 at locations which are sound and not rusted. The number and placement of the holes need only be sufficient to maintain the position of the strip. A rivet is applied into each of the holes which have been drilled. The rivets used are of the type commonly referred to as blind rivets or pop rivets.

The necessity for and extent of refinishing is ordinarily minimal. If the width of the decorative molding is sufficient to completely conceal the upper flange 12 of the strip, body refinishing will probably not be required. It is only necessary to fill the slots 15 and seal the flange 12 against entry of water, using commercially available fillers and sealants. The sealed flange 12 can be sanded to desired smoothness. In those instances where the upper part of the automobile is covered with vinyl, the final smoothing may even be unnecessary.

If the width of the decorative molding is sufficient to conceal the flange 12 or if there is no such decorative molding on the automobile, then it may even be desirable to braze or weld the edge of the flange 12 to the body of the automobile, and grind or sand this portion to a sufficient smoothness to permit refinishing to match the body colour. However, this circumstance would be the exception, rather than the rule.

The second extending portion 13 of the strip must be sealed so that water does not enter the interior of the automobile through the slots 17 or between the strip 10 and pinchweld 14.

Any suitable sealing material can be used which, when completely cured, prevents any water from entering between the strip and the pinchweld. More importantly, a sealer is preferred which remains flexible even after being completely cured. This flexibility is extremely advantageous in that the seal is able to take shocks or jolts transmitted through the automobile body or windshield, without necessarily damaging or cracking the sealant.

The roofline 22, surrounding the opening for the windshield, is continually subjected to motion stress during travel of the automobile, and particularly when changing the direction of travel, as in turning corners or when travelling over bumpy or uneven road surfaces. It is this motion stress which causes a torsional or twisting moment on the pinchweld, and consequent breakage or separation of the rigid glass-to-metal seal. By providing the pinchweld repair strip with the relatively isolated segment portions 19, the individual segments are free to accommodate separately to motion stress and be individually slightly displaced without effecting or disturbing other segments or other portions of the strip 10. With respect to the strip 10 and the support flange 13, the segments 19 constitute individual stress-relieving portions which are effective to minimize the likelihood of seal separation resulting from motion stress.

The reconstructed pinchweld 14 is now ready for installation of the windshield. If any studs for mounting the decorative molding have been removed, they must be replaced. Using normal installation procedures, the windshield is mounted and sealed and the decorative molding is replaced.

In another form of the invention, a modified repair strip 25 is utilized to reconstruct the badly deteriorated or rusted edge of an automobile fender 26, as shown in FIGS. 7 and 8 of the drawings. The modified repair strip 25 is similar to the previously described strip 10, except that the extension or support flange 13 is eliminated from the strip 25, leaving only the portion 11 and the slotted portion 12, previously described.

For installation, the deteriorated edge of the fender is cleaned and primed; the strip 25 is manually bent into conformity with the edge and secured against displacement, with the portion 11 underlying the edge of the fender and the portion 12 flush with the exterior surface; the visible flange portion 12 is filled, sealed and smoothed; and the repaired edge is refinished to match and blend into the body of the automobile. Thus, an inexpensive yet permanent and durable reconstuction is achieved.

It is to be understood that the forms of our invention herewith shown and described, are to be taken as preferred examples of the same and that various changes in the shape, size and arrangement of parts may be resorted to, without departing from the spirit of our invention, or the scope of the subjoined claims.

We claim:

1. A repair strip for reconstructing the pinchweld of an automobile, comprising a highly malleable, easily bendable, elongated, generally Z-shaped metal strip having essentially no elastic memory and having a central, longitudinally extending, generally vertical portion of relatively thin cross section which may be manually deformed, a first portion extending horizontally from one longitudinal edge of said central portion to provide an upper sealing flange, a second portion extending horizontally from the opposite longitudinal edge of said central portion in a direction opposite from said first portion to provide a lower support flange, said first and second portions each being interrupted with a plurality of closely-spaced part slots each intersecting its adjacent longitudinal edge of said central portion, and the slots in each of said first and second portions being in substantial planar alignment with each other relatively to said central portion, whereby said strip may be manually deformed arcuately along its longitudinal axis to conform to the pinchweld and retain its conformed shape.

2. A repair strip for reconstructing the pinchweld of an automobile as defined in claim 1, wherein each adjacent pair of slots in said second portion defines a substantially isolated support segment independently movable in response to motion stress to stress-relieve the remaining portions of said second portion and said repair strip.

3. A repair strip for reconstructing the pinchweld of an automobile as defined in claim 2, wherein the slots in said second portion are V-shaped, each of said V-shaped slots having a vertex intersecting its adjacent longitudinal edge of said central portion, and the angle defined by each of said V-shaped slots being great enough to permit bending of said repair strip into an arc of at least 90°.

4. The method of repairing a rusted portion of an automobile pinchweld, comprising the steps of removing the rusted portion of said pinchweld, manually conforming a slotted, substantially Z-shaped repair strip to the contour of the pinchweld in the vicinity of the rusted portion, positioning the repair strip within the pinchweld so as to bridge said rusted portion both within said pinchweld and in overlying relationship to the roofline of the automobile, securing the repair strip in said position, sealing said repair strip against water leakage both within said pinchweld and on the roofline, and smoothing that portion of the repair strip which overlies the roofline.

5. A repair strip for reconstructing the edge of an automobile fender, comprising a highly malleable, easily bendable, elongated, longitudinally-extending metal strip of generally L-shaped cross section having essentially no elastic memory, said strip having a first leg portion thereof extending in a generally horizontal direction, said strip having a second leg portion thereof coextensive with said first leg portion and extending substantially normal thereto, and said second leg portion being interrupted with a plurality of closely spaced slots, each extending from the free edge of said second leg portion to the longitudinal juncture of said second leg portion with said first leg portion, whereby said strip may be manually deformed arcuately along the longitudinal axis of said first leg portion to conform to the fender edge and retain its conformed shape.

* * * * *

UNITED STATES PATENT AND TRADEMARK OFFICE
CERTIFICATE OF CORRECTION

PATENT NO. : 4,206,536

DATED : June 10, 1980

INVENTOR(S) : George B. Hammond and Leonard B. Hammond

It is certified that error appears in the above-identified patent and that said Letters Patent are hereby corrected as shown below:

Claim 1 - Column 7, line 5 - "part" should read --apart--.

Signed and Sealed this

Ninth Day of September 1980

[SEAL]

Attest:

SIDNEY A. DIAMOND

Attesting Officer

Commissioner of Patents and Trademarks